W. L. Standish.
Bung Cutting Mach.

No. 67,079. Patented July 23, 1867.

Witnesses;
Theo Tusche
Wm Trewm

Inventor;
Wm L Standish
Per Munn & Co
Attorneys

United States Patent Office.

WILLIAM L. STANDISH, OF PITTSBURG, PENNSYLVANIA.

Letters Patent No. 67,079, dated July 23, 1867.

IMPROVEMENT IN MACHINES FOR CUTTING BUNGS.

The Schedule referred to in these Letters Patent and making part of the same.

TO ALL WHOM IT MAY CONCERN:

Be it known that I, WILLIAM L. STANDISH, of Pittsburg, in the county of Allegheny, and State of Pennsylvania, have invented a new and useful improvement in Machinery for Making Bungs, Plugs, Taps, &c.; and I do hereby declare that the following is a full, clear, and exact description thereof, which will enable others skilled in the art to make and use the same, reference being had to the accompanying drawings, forming part of this specification, in which—

Similar letters of reference indicate like parts.

The nature of this invention consists in constructing and combining mechanical devices for making bungs, plugs, taps, &c., for barrels and other purposes, and consists of a hollow cutter, tapering on the inside, worked by a slide on a guide-pin running through it, by which the wood blocks are cut and compressed on the points, in connection with which cutter are feeding devices, and a circular saw for cutting off the blocks to form the bungs, plugs, or taps from a strip of wood, which blocks are presented successively in front of the hollow cutter, and are released therefrom by the guide-rod, on which the cutter moves back and forth, to be discharged after they are cut and finished ready for use, all of which operations are performed automatically with great precision in the movements of the machinery, producing superior bungs, plugs, taps, &c., with a great saving of labor.

Figure 1:
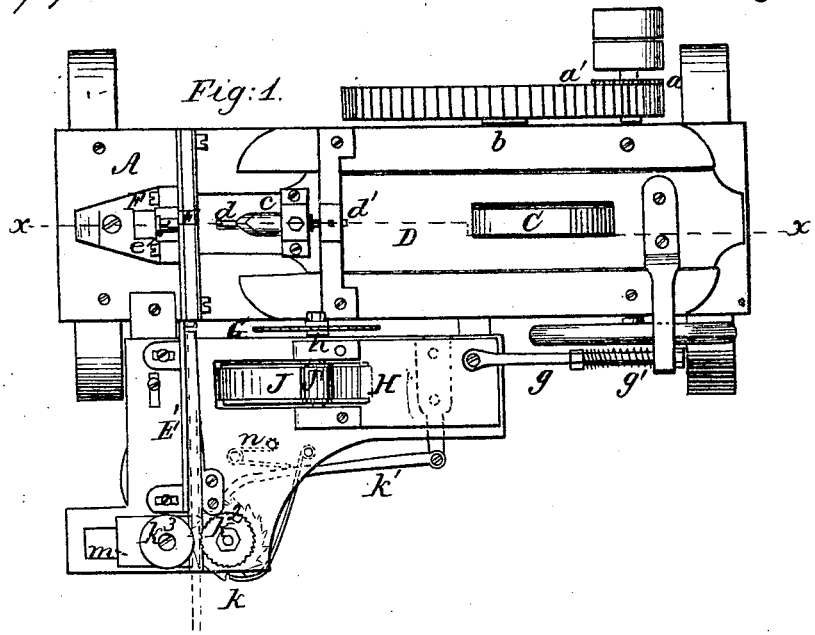
Figure 1 is a plan of my improved combined automatic machinery for cutting and compressing bungs, plugs, taps, &c.
Figure 2:
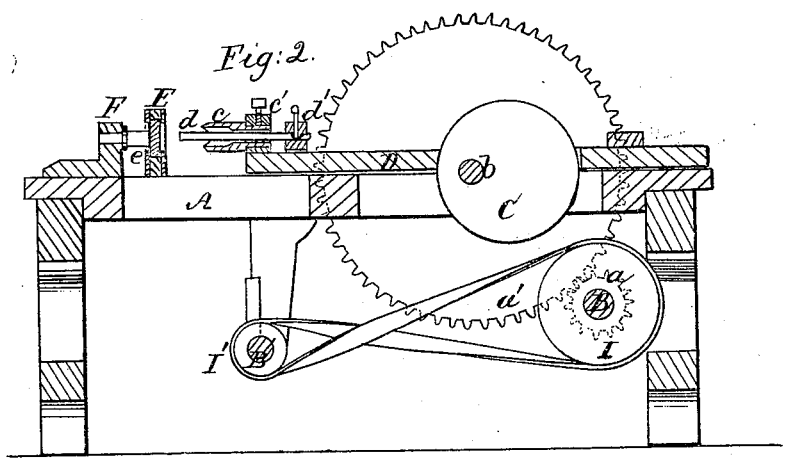
Figure 2 is a vertical longitudinal section, taken in the line $x\,x$, fig. 1.

A is a frame for supporting the machinery. B is the driving-shaft, actuated by steam or other power, and provided with a fly-wheel, on one end of which shaft is a pinion, $a$, engaging a large spur-wheel $a'$, placed on the upper shaft $b$, that carries an eccentric, C, for moving the main slide D, on the top of the frame, with the cutter $c$ at one end made fast to the cutter-head $c'$ by a set-screw. The cutter $c$ is made hollow, of one piece of steel bored out, with two opposite projecting points or lips, to cut gradually and prevent the fracture or splitting of the blocks, and they are made with a sharp edge on the inside by a bevel on the outside. The back end of the bore is made tapering or cupped, to give the proper taper shape to the bungs, &c., by compression. A guide-pin, $d$, passes through the cutter, and is made fast at the rear end to a cross-bar, $d'$, fixed on the frame. The front end extends nearly to a guide-bar, E, in which is a hole opposite the end of the cutter, through which it passes to cut the blocks in the box, which are backed by the flat face of a round die, $e$, set in a chuck, F, which the cutter passes over, and which is set on the frame to bear against the bung when it is cut, and force it into the hollow of the cutter for the purpose of compressing the point in a taper form. The guide-box E receives and guides the blocks successively in front of the cutter $c$, after they have been cut from a strip of wood by the circular saw G, on the arbor $h$, which is hung in a sliding-frame, H, connected by the rod $g$ with the main slide D, and actuated by a pulley, I, on the driving-shaft B, belted to the pulley I' on a counter-shaft, B', that drives a pulley, J, belted to a small pulley, J', on the saw-arbor $h$, as seen in fig. 1. The connecting-rod $g$ is provided with a spiral spring, $g'$, to guard the saw against accident in case of the belt slipping or breaking, and the rod $g$ is made adjustable by a screw on the end to regulate the reciprocating movement of the slide with the saw. The strip of wood is fed by a ratchet-wheel, $k$, placed under the bed-frame, worked by a pawl, $k^1$, connected with the saw slide-frame H, and borne into the teeth of the ratchet-wheel by a spring, $n$, and the strip passes between two feed rolls, $k^2\,k^3$, on the upper side of the bed, one of which rolls, $k^2$, is on the arbor of the ratchet-wheel, while the feed-roll $k^3$ is pivoted on a slide, $m$, that draws it up by means of a weight and pulley below the bed, to press against the strip of wood and bear it upon the feed-wheel $k^2$, but a spring may be employed for the same purpose. Between the feed-rolls and the guide-box E is a guide-way, E', for the strip of wood to pass through in front of the saw, to be cut into blocks, which are pushed on into the guide-box, to be cut by the cutter into bungs.

The operation is manifest: The strip of wood is moved up by the ratchet-wheel the proper distance for cutting off a block by the saw, which comes up to the work with the slide H, when the main slide D moves back after the cutter $c$ has cut the bung by the forward movement of the slide, actuated by the eccentric C. The bung, plug, or tap, when cut, remains in the hollow cutter, and is withdrawn by it from the guide-box E until it strikes the end of the guide-pin $d$, which then pushes it out and discharges it finished.

Having described my invention, I claim as new, and desire to secure by Letters Patent—

1. The hollow taper steel cutter $c$, the guide-pin $d$, the guide-box E, and the die $e$, constructed, combined, and operating substantially as and for the purposes herein described.

2. The combination of the saw G, and the sliding-frame H and D, constructed and operating substantially as and for the purpose herein specified.

3. The ratchet-wheel $k$ and pawl $k^1$ in combination with the feed-rolls $k^2$ $k^3$, and the slide-frame H, arranged and operating substantially as and for the purpose specified.

4. The combination of the hollow cutter $c$, the guide-pin $d$, the guide-box E, the die $e$, the saw G, the ratchet $k$, the feed-rolls $k^2$ $k^3$, and the slides D and H, or the equivalents of them or either of them, when combined and organized substantially as described for cutting the blocks and pointing or tapering the ends of bungs, plugs, or taps, in the manner specified.

WILLIAM L. STANDISH.

Witnesses:
 Tom. M. Armstrong,
 Thomas Barnes,
 And. Humbert.